United States Patent Office 3,505,217
Patented Apr. 7, 1970

3,505,217
PROCESS FOR THE DESTRUCTION OF CYANIDE
IN WASTE SOLUTIONS
John L. Morico, North Haven, Conn., assignor to Enthone,
Incorporated, West Haven, Conn., a corporation of
Connecticut
No Drawing. Filed May 3, 1968, Ser. No. 726,569
Int. Cl. C02c 5/02
U.S. Cl. 210—59                                    17 Claims

ABSTRACT OF THE DISCLOSURE

This invention concerns a process for the destruction of free and/or chemically combined cyanide present in waste solutions so as to render the solution suitable for safe disposal. The process involves mixing together the cyanide-containing waste solution and an aldehyde and/or a water-soluble bisulfite addition reaction product thereof, with the aldehyde or addition reaction product thereof supplied in the stoichiometric amount and preferably in excess over the stoichiometric amount required for reaction with all the cyanide present. The selected material and free and/or chemically combined cyanide of the waste solution are then reacted together at room temperature or elevated temperature until the cyanide has been converted into nontoxic materials to that degree required for safe disposal of the solution.

BACKGROUND OF THE INVENTION

Field of the invention

This invention relates to the destruction of cyanide and more especially a new and improved process for the destruction of free and/or chemically combined cyanide present in waste solutions so as to render the solution suitable for safe disposal.

Description of the prior art

Waste solutions containing toxic amounts of cyanide are obtained in a variety of industrial operations, for instance metal stripping processes and electroplating processes. The waste solutions must be disposed of and, due to their cyanide content, serious problems have been encountered heretofore in their disposal due to their toxicity to both aquatic and nonaquatic life. Depending on their origin, the waste solutions contain free cyanide and/or chemically combined cyanide typically tightly bound in a complex. Legislation has been enacted which requires that all cyanide be partially or substantially completely decomposed or converted into nontoxic material before the waste streams can be discharged into streams, rivers or other usual disposal facilities.

One method for destruction of the cyanide in waste solutions reported in the prior art involves exposing the solution to gamma radiation. The radiation results in rupture of the C≡N triple bonds to thereby convert the cyanide ions into nontoxic byproducts, which could be safely discharged into streams or otherwise disposed of. Although such radiation method may give good results in the destruction of cyanide ions, plating and metal finishing shops ordinarily do not have the necessary radiation equipment or apparatus available to practice the method and such equipment can only be obtained by a considerable monetary expenditure.

Efforts to destroy free cyanide in waste solutions in the past have also involved the addition of $Fe^{+++}$ ions to the solution to form an iron-cyanide complex with the cyanide tightly bound in the complex. However this method suffers from the cyanide radical still being intact after the completion of the method, and hence significant toxicity still being present in the solution.

SUMMARY OF THE INVENTION

In accordance with the present invention, I have found that free and/or chemically combined cyanide present in harmful or toxic amounts in waste solutions can be destroyed so as to enable safe disposal of the solution. The process of this invention involves mixing together the cyanide-containing waste solution, for instance a cyanide-containing aqueous spent metal-stripping solution containing chemically combined cyanide which is tightly bound in a complex, and one or more alhedydes and/or a water-soluble bisulfite addition reaction product compound of the aldehyde, with the aldehyde and/or soluble bisulfite addition reaction product thereof supplied in stoichiometric amount or in excess over the stoichiometric amount required for reaction with all the cyanide present. The aldehyde or aldehydes and/or bisulfite addition reaction product compound therof and the cyanide of the waste solution are reacted together at room temperature or elevated temperature until the cyanide has been chemically converted into nontoxic materials to that degree to enable safe disposal of the solution. The process herein is additionally characterized by (1) being relatively inexpensive and not requiring special and costly equipment such as radiation equipment, and (2) destroying tightly bound cyanides present in highly stable metal-cyanide complexes as well as free cyanide ions.

The term "aldehyde" and the general formula therefor hereafter specified are used herein in a broad sense to mean not only the aldehyde or aldehydes per se, but also polymers of aldehydes such are paraformaldehyde and paraldehyde, and materials which yield the aldehyde per se in the reaction mixture under the reaction conditions utilized for destruction of the cyanide. Depending on the particular polymeric aldehyde, the polymeric aldehyde may or may not yield the aldehyde per se in the reaction mixture under the reaction conditions for destruction of the cyanide.

DESCRIPTION OF THE PREFERRED EMBODIMENTS

The aldehyde or aldehydes herein are usually of the general formula:

wherein R is a hydrogen atom, an aliphatic radical, an aromatic radical, or a heterocyclic oxygen or sulfur radical. Exemplary of the aliphatic and aromatic radicals are alkyl, aryl, aralkyl and alkaryl radicals. The alkyl radical. Exemplary of the aliphatic and aromatic radicals are exemplified by mono-and bicyclic aryl such as phenyl and naphthyl, the aralkyl radicals are exemplified by ar-lower alkyl, e.g. benzyl; and the alkaryl radicals are exemplified by lower alkyl-aryl, e.g. methyl phenyl. Exemplary of the heterocyclic oxygen and sulfur radicals are heterocyclic radicals containing 5 ring atoms from the group of C, O and S, 4 of which are C atoms, e.g. the radical

and the thienyl radical, i.e.

By "lower alkyl" is meant 1–5 C alkyl. The aliphatic, aromatic or heterocyclic oxygen or sulfur radicals can be unsubstituted or substituted. Thus, for example, the alkyl, aralkyl, aryl, or alkaryl radical can be substituted by hydroxy, methoxy, halo, e.g. chloro or bromo, or sulfonic acid substituents; and the heterocyclic oxygen or heterocyclic sulfur radical can be substituted by hydroxy, methoxy, halo, e.g. chloro or bromo, or sulfonic acid substituents. A cyanide group or groups should not be a substituent for any of such radicals.

Examples of aldehydes herein which will react with the free and/or combined cyanide in the waste aqueous solutions to result in the destruction of the cyanide are:

formaldehyde
acetaldehyde
propionaldehyde
butyraldehyde
n-amyl aldehyde
n-caproic aldehyde
n-heptyl aldehyde
caprylaldehyde
capraldehyde
n-undecylaldehyde
dodecanal
piperonal, i.e.

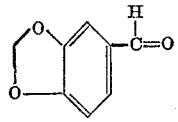

salicylaldehyde, i.e.

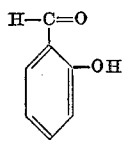

anisic aldehyde, i.e.

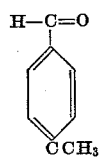

benzaldehyde, i.e.

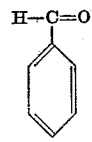

veratraldehyde, i.e.

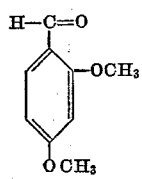

p-hydroxybenzaldehyde, i.e.

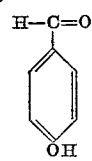

vanillin, i.e.

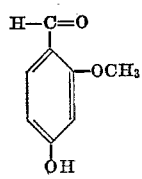

2,4-dichlorobenzaldehyde, i.e.

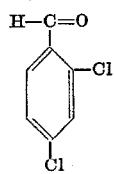

2-methyl 2-ethyl 3-hydroxy propionaldehyde, i.e.

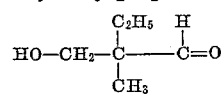

o-tolualdehyde, i.e.

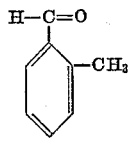

m-tolualdehyde, i.e.

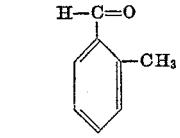

p-tolualdehyde, i.e.

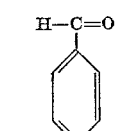

phenylacetaldehyde, i.e.

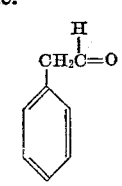

furfural, i.e.

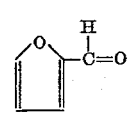

thiophenecarbonal, i.e.

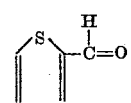

5-methyl-furfural, i.e.

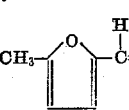

glutaraldehyde, i.e.

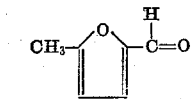

1-naphthaldehyde, i.e.

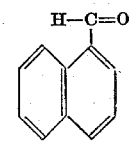

2-hydroxy, 1-napthaldehyde, i.e.

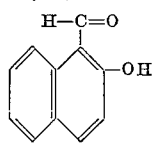

The preferred reactant herein for destroying the cyanide is formaldehyde. The formaldehyde is preferably utilized as an aqueous solution of about 37% formaldehyde concentration, i.e. as formalin.

The water-soluble bisulfite addition reaction product compound of the aldehyde herein usually has the formula

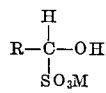

where R has the meaning aforesaid and M is a hydrophilic or water-solubilizing cation, preferably an alkali metal, e.g., —Na or —K, or ammonium. One or more molecules of water of crystallization may be included in such formula. The soluble bisulfite addition reaction product compound is prepared by reacting the water-soluble bisulfite, preferably a water-soluble alkali-bisulfite, e.g. sodium, potassium or ammonium bisulfite, with the particular aldehyde by mixing together the bisulfite and the aldehyde at 160° F.

Preferably, there is utilized herein an excess of the aldehyde or soluble bisulfite addition reaction compound thereof over the stoichiometric amount thereof required for reaction with all of the cyanide, i.e., free and/or chemically combined cyanide, present to convert the cyanide into nontoxic materials. More preferably a large excess, which is at least a 75% excess, of the aldehyde or soluble bisulfite addition reaction product compound thereof over the stoichiometric amount required for reaction with all the cyanide is utilized herein.

The reaction of the selected material herein with the cyanide is effected at room temperature or at elevated temperature up to about 160° F. or somewhat higher. In general the use of elevated temperature results in a shorter time requirement than required by room temperature, for destruction of the cyanide to that degree to render the waste solutions suitable for safe disposal. However with formaldehyde, a preferred compound herein for reaction with the free and/or combined cyanide, the problem is confronted of decomposition and evolvement of the formaldehyde from the reaction mixture at elevated reaction temperature whereby the aldehyde is not available for reaction with all of the cyanide, which evolvement and decomposition does not occur at room temperature. Consequently room temperature is a preferred reaction temperature when formaldehyde is to be reacted with the cyanide. Reaction temperatures slightly below room temperature may also be employed when formaldehyde is a reactant. Elevated reaction temperatures in the range from about 120° F. to about 160° F. are preferably utilized herein for the remaining aldehydes, and bisulfiite addition reaction product compound of the aldehyde, and reaction temperature somewhat above 160° F. and between 120° F. and room temperature may also be utilized for such remaining aldehydes and bisulfite addition reaction product compounds thereof although less preferred.

The reaction time for destroying or converting the free and/or combined cyanide into nontoxic materials to that degree required for safe disposal of the waste solution, will vary in accordance with the particular selected material to be reacted with the cyanide viz. the aldehyde or soluble bisulfite addition reaction product compound of the aldehyde, the quantity of total cyanide contained in the waste solution, and the reaction temperature. In general, the reaction times for such destruction of the free and/or combined cyanide are shorter at elevated reaction temperatures than at room temperature. Large amounts of free and/or combined cyanide in the waste solutions will require longer reaction times for destruction of the cyanide to that degree required for safe disposal than will waste solutions containing smaller amounts of the free and/or combined cyanide. Typical reaction times for destruction of the free and/or combined cyanide to that degree required for safe disposal of the waste aqueous solution are in the range from about 1–24 hours at a reaction temperature of the waste solution of about 130° F., and in the range from about 1–66 hours for such cyanide destruction at a reaction temperature of the waste solution of room temperature.

Alternatively, the cyanide can be destroyed in the waste solution in accordance with this invention to a level of cyanide to a limited extent above the maximum concentration thereof legally permitted in the solution for safe disposal, and then diluted with an aqueous liquid, usually water, prior to its disposal to lower the cyanide concentration to below the maximum concentration permitted therein.

When the cyanide is tightly or strongly complexed with a metal, for example iron, nickel, or cobalt, an acid is preferably supplied to the reaction mixture in amount sufficient to accelerate the release of the cyanide from the tight complex whereby the destruction of the cyanide by the aldehyde or soluble bisulfite addition reaction product thereof is accelerated. Thus in the case of tightly complexed cyanide in $K_3M(CN)_6$ wherein M is Fe or Co and in $Ni(CN)_2-2KCN \cdot H_2O$, an acid is preferably supplied to the reaction mixture in sufficient amount to accelerate the release of the cyanide from the complex by accelerating the breakdown of the complex. Due to the release of the cyanide from the tight complex the destruction of the cyanide is accelerated. The acid is preferably a mineral acid, e.g. sulfuric, hydrochloric, nitric or phosphoric acid. It appears the acid neutralizes the excess free alkali present resulting in hastening the release of the cyanide from the complex. The amount of acid utilized when the tight complex is $K_3Fe(CN)_6$ is typically 20 ml. of $H_2SO_4$ of 98% acid concentration per liter of waste solution containing the $K_3Fe(CN)_6$.

Exemplary of chemically combined cyanide which can be destroyed or converted to nontoxic materials by this invention is the tightly complexed cyanide present in used or spent aqueous metal stripping solutions. Such complexes are metal-cyanide complexes exemplified by a nickel-cyanide complex, copper-cyanide complex, zinc-cyanide complex, cadmium-cyanide complex, brass-cyanide complex, gold-cyanide complex, silver-cyanide complex and a tin-cyanide complex wherein the metal is that stripped from the substrate or article treated with the stripping solution. The spent stripping solution containing this metal-cyanide complex will also contain an unreacted nitroaromatic compound, one or more reduction products of the nitroaromatic compound, and water.

The mixing together of the selected material and the cyanide-containing waste solution for the destruction of the free and/or combined cyanide by this invention, can be effected by, for example, adding the aldehyde and/or soluble bisulfite addition reaction product compound thereof to a liquid body of the cyanide-containing waste solution contained in a reaction vessel equipped with an agitator or stirrer and with heating means when elevated reaction temperatures are to be employed, or by adding such waste solution to the aldehyde and/or solube bisulfite addition reaction product compound thereof in the reaction vessel. The reaction vessel can be any suitable vessel and fabricated, for instance, of ferrous metal.

The reactions involved may vary from one waste solution to another, depending partially on the source of the solution and hence the precise constituents of the cyanide-containing waste solution. Notwithstanding this, the cyanide is converted or broken down into materials which are nontoxic, i.e., suitable for discharge in dilute form into streams, etc., and to the atmosphere. Such nontoxic materials include ammonia, hydroxy acids, amino acids and salts of the hydroxy acids and amino acids, e.g., alkali metal salts of such acids. The mechanism of the destruction of the cyanide in the waste aqueous solution employing formaldehyde in accordance with this invention is believed to be in accordance with the following equations:

$$KCN + CH_2O(aqueous) + H_2O \rightarrow HOCH_2CN + KOH$$
$$CNCH_2OH + KOH + H_2O \rightarrow HOCH_2COOK + NH_3$$
\* \* \* \* \*
$$CNCH_2OH + NH_3 \rightarrow NH_2CH_2CN + H_2O$$
$$NH_2CH_2CN + KOH + H_2O \rightarrow NH_2CH_2COOK + NH_3$$
\* \* \* \* \*
$$NH_2CH_2CN + HOCH_2CN \rightarrow NH(CH_2CN)_2 + H_2O$$
$$NH(CH_2CN)_2 + 2KOH + 2H_2O \rightarrow$$
$$NH(CH_2COOK)_2 + 2NH_3$$
\* \* \* \* \*
$$NH_2CH_2CN + 2HOCH_2CN \rightarrow N(CH_2CN)_3 + 2H_2O$$
$$N(CH_2CN)_3 + 3KOH + 3H_2O \rightarrow N(CH_2COOK)_3 + 3NH_3$$

The destruction or conversion of the cyanide is to that degree enabling safe disposal of the waste solution, for example destruction of 95% or more, or 98% or more, of the total cyanide present.

The following examples further illustrate the invention. A number of aliphatic and aromatic aldehydes, certain soluble bisulfite addition reaction product compounds of the aldehyde with an alkali metal bisulfite, and polymers of formaldehyde and acetaldehyde were evaluated for their effectiveness in destroying cyanides present in a solution. In the test runs of the examples, sufficient sulfuric acid of 98% $H_2SO_4$ concentration is added to an aqueous solution of $K_3Fe(CN)_6$ in a reaction vessel to yield a solution of 2% $H_2SO_4$ concentration. The $K_3Fe(CN)_6$ is ordinarily a difficult cyanide complex to break down due to the cyanide being tightly bound in the complex. The purpose of the sulfuric acid was to accelerate the release of the cyanide from the tight complex $K_3Fe(CN)_6$, whereby destruction of the cyanide by the aldehyde, bisulfite addition reaction product compound thereof or aldehyde polymer was accelerated. The amount of each aldehyde, aldehyde bisulfite reaction product compound thereof, or aldehyde polymer necessary to stoichiometrically react with all the cyanide present was also mixed together with this solution of $K_3Fe(CN)_6$. Two reaction temperatures, 75° F. and 160° F. were utilized. The following table shows the amount of cyanide destroyed, and the amounts of $K_3Fe(CN)_6$ and aldehyde utilized in each example.

hyde of Example 2 resulted in destruction of 64.6% of the cyanide present, the use of paraldehyde of Example 4 resulted in destruction of 64.6% of the cyanide, piperonal of Example 5 in 82.7% of the cyanide destroyed, salicylaldehyde of Example 6 in 88.0% of the cyanide destroyed, sodium glutaraldehyde bisulfite of Example 7 in destruction of 98.9% of the cyanide, and sodium formaldehyde bisulfite of Example 8 in 77.7% of the cyanide being destroyed to form nontoxic reaction products at a reaction temperature of 160° F. and a reaction time of 2 hours. The acetaldehyde, paraldehyde, piperonal, silicylaldehyde, sodium glutaraldehyde bisulfite and sodium formaldehyde bisulfite of Examples 2 and 4–8 respectively of the table would have resulted in destruction of all the cyanide present, i.e., 100% of the cyanide present, with the use of longer reaction times and of sufficient length to accomplish the cyanide destruction to form nontoxic reaction products.

EXAMPLE 9

To a spent cyanide-containing, alkaline aqueous metal-stripping solution employed for stripping nickel from a ferrous metal substrate and containing a total of 9.5 ounces of sodium cyanide per gallon of spent solution, was added 24 ounces of aqueous formaldehyde solution of 37% formaldehyde concentration per gallon of the spent solution. The spent stripped solution also contained unreacted sodium m-nitrobenzenesulfonate, reduction products of such nitroaromatic compound, and water. At a reaction temperature of 72° F. and after a reaction time of 21 hours, 1.5 oz./gal. of sodium cyanide remained, with the difference and major portion of such cyanide destroyed. At the same reaction temperature and after a reaction time of 66 hours, 1.1 oz./gal. of sodium cyanide remained with the difference and major portion of such cyanide destroyed. At a reaction temperature of 190° F. and after a reaction time of 2 hours, 0.2 ounce per gallon of sodium cyanide remained, with the difference and major portion of the cyanide destroyed. The solution, after the cyanide destruction and prior to disposal thereof, is diluted with water to a cyanide concentration off 3 p.p.m. or lower.

EXAMPLE 10

The procedure of Example 3 of the foregoing table is repeated except with benzaldehyde as the reactant, and with a reaction temperature of 160° F. The reaction is carried out until the cyanide is converted into nontoxic materials to that degree which enables safe disposal of the solution.

|  | Example 1 | Example 2 | Example 3 | Example 4 | Example 5 | Example 6 | Example 7 | Example 8 |
|---|---|---|---|---|---|---|---|---|
|  | Aldehyde | | | | | | | |
|  | Formaldehyde | Acetaldehyde | Paraformaldehyde | Paraldehyde | Piperonal | Salicylaldehyde | Sodium Glutaraldehyde Bisulfite | Sodium Formaldehyde Bisulfite |
| Amount $K_3Fe(CN)_6$ used, g | 1.5 | 1.5 | 1.5 | 1.5 | 1.5 | 1.5 | 1.5 | 1.5 |
| Amount CN⁻ in above, g | 0.71 | 0.71 | 0.71 | 0.71 | 0.71 | 0.71 | 0.71 | 0.71 |
| Amount aldehyde used, g | 2.5 | 1.4 | 5.0 | 4.11 | 4.7 | 3.8 | 5.0 | 5.0 |
| Weight CN⁻ destroyed at 75° F., g | 0.791 | 0.166 | 0.750 | 0.402 | 0.119 | 0.121 | 0.570 | 0.464 |
| Percent CN⁻ destroyed at 75° F | 100 | 23.4 | 100 | 56.6 | 16.8 | 17.0 | 80.3 | 65.4 |
| Weight CN⁻ destroyed at 160° F., g | 0.374 | 0.459 | 0.682 | 0.459 | 0.587 | 0.624 | 0.702 | 0.552 |
| Percent CN⁻ Destroyed at 160° F | 52.7 | 64.6 | 96.1 | 64.6 | 82.7 | 88.0 | 98.9 | 77.7 |

The test results of the table show that all of the aldehydes, the polymers of formaldehyde and acetaldehyde, and the bisulfite addition reaction product compound of the aldehyde with sodium bisulfite resulted in destruction of the cyanide. The use of formaldehyde and its polymer paraformaldehyde of Examples 1 and 3 respectively of the table resulted in destruction of all the cyanide present, i.e., 100% of the cyanide present, in a reaction time of 24 hours and at a reaction temperature of 75° F. to form nontoxic reaction products; and the use of acetalde-

EXAMPLE 11

The procedure of Example 3 is repeated except with n-amyl aldehyde as the reactant, and with a reaction temperature of 160° F. The reaction is carried out until the cyanide is converted into nontoxic materials to that degree which enables safe disposal of the solution.

EXAMPLE 12

The procedure of Example 3 is repeated except with caprylaldehyde as the reactant and with a reaction temperature of 160° F. The reaction is carried out until the cyanide is converted into nontoxic materials to that degree which enables safe disposal of the solution.

EXAMPLE 13

The procedure of Example 3 is repeated except with piperonal as the reactant, and with a reaction temperature of 160° F. The reaction is carried out until the cyanide is converted into nontoxic materials to that degree which enables safe disposal of the solution.

EXAMPLE 14

The procedure of Example 3 is repeated except with salicylaldehyde as the reactant, and with a reaction temperature of 160° F. The reaction is carried out until the cyanide is converted into nontoxic materials to that degree which enables safe disposal of the solution.

EXAMPLE 15

The procedure of Example 3 is repeated except with anisic aldehyde as the reactant, and with a reaction temperature of 160° F. The reaction is carried out until the cyanide is converted into nontoxic materials to that degree which enables safe disposal of the solution.

EXAMPLE 16

The procedure of Example 3 is repeated except with vanillin as the aldehyde reactant, and with a reaction temperature of 160° F. The reaction is carried out until the cyanide is converted into nontoxic materials to that degree which enables safe disposal of the solution.

EXAMPLE 17

The procedure of Example 3 is repeated except with 2,4-dichlorobenzaldehyde as the aldehyde reactant, and with a reaction temperature of 160° F. The reaction is carried out until the cyanide is converted into nontoxic materials to that degree which enables safe disposal of the solution.

EXAMPLE 18

The procedure of Example 3 is repeated except with o-tolualdehyde as the aldehyde reactant, and with a reaction temperature of 160° F. The reaction is carried out until the cyanide is converted into nontoxic materials to that degree which enables safe disposal of the solution.

EXAMPLE 19

The procedure of Example 3 is repeated except with phenylacetaldehyde as the aldehyde reactant, and with a reaction temperature of 160° F. The reaction is carried out until the cyanide is converted into nontoxic materials to that degree which enables safe disposal of the solution.

EXAMPLE 20

The procedure of Example 3 is repeated except with furfural as the aldehyde reactant, and with a reaction temperature of 160° F. The reaction is carried out until the cyanide is converted into nontoxic materials to that degree which enables safe disposal of the solution.

EXAMPLE 21

The procedure of Example 3 is repeated except with thiophenecarbonal as the aldehyde reactant, and with a reactant temperature of 160° F. The reaction is carried out until the cyanide is converted into nontoxic materials to that degree which enables safe disposal of the solution.

EXAMPLE 22

The procedure of Example 3 is repeated except with 5-methyl furfural as the aldehyde reactant, and with a reaction temperature of 160° F. The reaction is carried out until the cyanide is converted into nontoxic materials to that degree which enables safe disposal of the solution.

EXAMPLE 23

The procedure of Example 3 is repeated except with p-hydroxy benzaldehyde as the aldehyde reactant, and with a reaction temperature of 160° F. The reaction is carried out until the cyanide is converted into nontoxic materials to that degree which enables safe disposal of the solution.

EXAMPLE 24

The procedure of Example 7 of the table is repeated with sodium glutaraldehyde bisulfite as the reactant and at a reaction temperature of 75° F., except that the reaction is carried out until 95% of the total cyanide present is converted into nontoxic materials, whereby the solution can be safely disposed of.

EXAMPLE 25

The procedure of Example 8 of the table is repeated with sodium formaldehyde bisulfite as the reactant and at a reduction temperature of 75° F., with the exception that the reaction is carried out until 95% of the total cyanide present is converted into nontoxic materials. Consequently, the solution can be safely disposed of.

EXAMPLE 26

The procedure of Example 3 is repeated with benzaldehyde as the reactant and at a reaction temperature of 160° F., with the exception that the reaction is carried out until 95% of the total cyanide is converted into nontoxic materials. Consequently the solution can be safely disposed of.

EXAMPLE 27

The procedure of Example 3 is repeated with 1-naphthaldehyde as the reactant and at a reaction temperature of 160° F., with the exception that the reaction is carried out until 95% of the total cyanide is converted into nontoxic materials. Consequently the solution can be safely disposed of.

The language "reacting the selected material and the cyanide" until the cyanide has been converted into nontoxic materials is used herein in a broad sense to mean not only the reaction between the aldehyde, soluble bisulfite addition reaction product compound of the aldehyde, paraformaldehyde or paraldehyde and the cyanide in accordance with and as exemplified by the first listed equation previously set forth herein, but also the occurrence of additional reactions in accordance with and as exemplified by the other equations previously set forth herein, all of which reactions constitute the mechanism for destruction of the cyanide into the nontoxic materials.

What is claimed is:

1. A process for the destruction of cyanide tightly complexed in a cyanide-metal complex present in waste solutions so as to render the solutions suitable for safe disposal, which comprises mixing together the cyanide-containing waste solution and at least one material selected from the group consisting of an aldehyde and water-soluble bisulfite addition reaction product compounds of the aldehyde, the selected material being supplied in at least the stoichiometric amount for reaction with all the cyanide present, supplying an acid to the reaction mixture in amount sufficient to accelerate release of the cyanide from the complex, and reacting the selected material and the cyanide at a reaction temperature until the cyanide has been converted into nontoxic materials.

2. The process of claim 1 wherein the selected material is from those of the formulae

wherein R is from the group consisting of hydrogen, an aliphatic radical, an aromatic radical, a heterocyclic oxygen radical and a heterocyclic sulfur radical, and

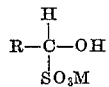

wherein R has the meaning aforesaid and M is a water-solubilizing cation.

3. The process of claim 1 wherein the selected material is an aliphatic aldehyde.

4. The process of claim 3 wherein the aldehyde is acetaldehyde.

5. The process of claim 2 wherein M of the formula

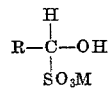

is an alkali metal.

6. The process of claim 5 wherein M is sodium.

7. The process of claim 1 wherein an excess of the selected material over the stoichiometric amount required to react with all cyanide present, is mixed together with the cyanide-containing waste solution.

8. The process of claim 7 wherein at least a 75% excess of the selected material over the stoichiometric amount required to react with all cyanide present, is utilized.

9. The process of claim 1 wherein the reacting is effected at a temperature in the range from room temperature to about 160° F. inclusive.

10. The process of claim 1 wherein the acid is a mineral acid.

11. The process of claim 10 wherein the acid is sulfuric acid.

12. The process of claim 1 wherein the aldehyde is formaldehyde.

13. The process of claim 1 wherein the selected material is an aromatic aldehyde.

14. The process of claim 13 wherein the aldehyde is piperonal.

15. The process of claim 13 wherein the aldehyde is salicylaldehyde.

16. The process of claim 1 wherein the selected material is sodium formaldehyde bisulfite.

17. The process of claim 1 wherein the selected material is sodium glutaraldehyde bisulfite.

References Cited

UNITED STATES PATENTS 2,859,090  11/1958  Karchmer et al. _____ 23—151 X

OTHER REFERENCES

Gurnham, C. F.: Principles of Industrial Waste Treatment, 1955, John Wiley and Sons, N.Y., p. 253 relied on.

MICHAEL E. ROGERS, Primary Examiner

U.S. Cl. X.R.

23—84, 151

UNITED STATES PATENT OFFICE
CERTIFICATE OF CORRECTION

Patent No. 3,505,217    Dated April 7, 1970

Inventor(s) John L. Morico

It is certified that error appears in the above-identified patent and that said Letters Patent are hereby corrected as shown below:

Column 1, line 22, --the-- should be inserted after "and". Column 2, line 31 "are" should read --as--; line 51, "cal" should read --cals--; line 51, ". Exemplary of the aliphatic and aromatic radicals should be deleted. Column 3, line 36, "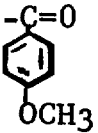" should read --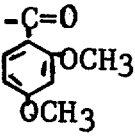--; line 51, "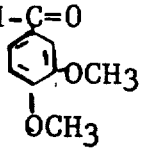" should read --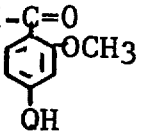--; line 69, "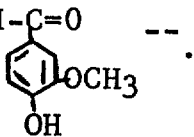" should read ----.

Column 4, line 23, "" should read --H-C=0 with CH3 on ring--.

Column 6, line 66, "solube" should read --soluble--. Column 10, line 22, "reduction" should read -- reaction --.

SIGNED AND SEALED
SEP 8 1970

(SEAL)
Attest:

Edward M. Fletcher, Jr.
Attesting Officer

WILLIAM E. SCHUYLER, JR.
Commissioner of Patents